(12) United States Patent
Golovchinsky et al.

(10) Patent No.: US 6,370,551 B1
(45) Date of Patent: *Apr. 9, 2002

(54) METHOD AND APPARATUS FOR DISPLAYING REFERENCES TO A USER'S DOCUMENT BROWSING HISTORY WITHIN THE CONTEXT OF A NEW DOCUMENT

(75) Inventors: Gene Golovchinsky; Morgan N. Price, both of Palo Alto; William Noah Schilit, Menlo Park, all of CA (US)

(73) Assignee: Fuji Xerox Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/059,204

(22) Filed: Apr. 14, 1998

(51) Int. Cl.[7] .............................................. G06F 17/30
(52) U.S. Cl. ...................................... 707/512; 707/530
(58) Field of Search .............................. 707/501, 10, 2, 707/512, 3, 530

(56) References Cited

U.S. PATENT DOCUMENTS

| | | | | | |
|---|---|---|---|---|---|
| 4,982,344 | A | * | 1/1991 | Jordan | 707/501 |
| 5,404,295 | A | * | 4/1995 | Katz et al. | 707/2 |
| 5,418,948 | A | * | 5/1995 | Turtle | 707/4 |
| 5,446,891 | A | * | 8/1995 | Kaplan et al. | 364/274 |
| 5,634,121 | A | * | 5/1997 | Tracz et al. | 707/2 |
| 5,694,594 | A | * | 12/1997 | Chang | 707/6 |
| 5,708,825 | A | * | 1/1998 | Sotomayor | 707/501 |
| 5,806,077 | A | * | 9/1998 | Wecker | 345/346 |
| 5,812,769 | A | * | 9/1998 | Graber et al. | 707/501 |
| 5,822,539 | A | * | 10/1998 | van Hoff | 709/236 |
| 5,832,474 | A | * | 11/1998 | Lopresti et al. | 707/2 |
| 5,845,301 | A | * | 12/1998 | Rivette et al. | 707/512 |
| 5,870,770 | A | * | 2/1999 | Wolfe | 707/501 |
| 5,873,107 | A | * | 2/1999 | Borovoy et al. | 707/501 |
| 5,877,757 | A | * | 3/1999 | Baldwin et al. | 707/501 |
| 5,890,173 | A | * | 3/1999 | Yoda | 707/501 |
| 5,963,956 | A | * | 10/1999 | Smartt | 707/501 |
| 6,006,217 | A | * | 12/1999 | Lumsden | 707/10 |
| 6,138,129 | A | * | 10/2000 | Combs | 707/501 |

FOREIGN PATENT DOCUMENTS

EP 0809197 11/1997

OTHER PUBLICATIONS

"Website Authoring Using Dynamic Hypertext", Rick Bodner et al., Hypermedia 3 (1).

"Automatic Hypermedia Line Generation", IBM Technical Disclosure Bulletin, vol. 35, No. 1A, pp. 447–448, Jun. 1992.

"What the Query Told the Link: The Integration of Hypertext and Information Retrieval", Gene Golovchinsky, Hypertext 97, pp. 67–74, 1997.

(List continued on next page.)

Primary Examiner—Stephen S. Hong
(74) Attorney, Agent, or Firm—Oliff & Berridge, PLC

(57) ABSTRACT

An electronic document reader supplements a new document with selectable links that reference portions of previously read documents that have content similar to a passage of the new document. The portions of the previously read documents may be previously identified and stored in a memory to expedite processing. The portions of previously read documents are identified by annotations or explicitly by a user. The identified portions are indexed, clustered and are used as proxies for topics. This invention segments a new document into passages and matches the passages to the stored topics based on the similarity of the content. The topics that exceed a content similarity threshold cause corresponding selectable links to be displayed in the display of the new document near the corresponding passage. The user of this invention can then choose to follow the selectable link to learn more about the topic of the corresponding segment. In this manner, this invention aids a reader in connecting material in the new document with material in previously read documents.

34 Claims, 7 Drawing Sheets

OTHER PUBLICATIONS

"On the Use of Information Retrieval Techniques for the Automatic Construction of Hypertext", Maristella Agosti et al., Information Processing & Management, vol. 33, No. 2, pp. 133–144, 1997.

"HieNet: A User–Centered Approach for Automatic Link Generation", Daniel T. Chang, Hypertext '93 Proceedings, pp. 145–158, Nov. 1993.

Chalmers, M. et al., *Bead: Explorations in Information Visualization*, Technical Report EPC–1991–127, Proceedings of SIGIR '92, A special issue of SIGIR Forum, Jun. 1992, Copenhagen, Denmark, pp. 330–337.

Rhodes, B. et al., *Remembrance Agent—A continuously running automated information retrieval system*, The Proceedings of The First International Conference on The Practical Application Of Intelligent Agents and Multi Agent Technology (PAAM '96), pp. 487–495.

Maarek, Y. et al., *Automatically Organizing Bookmarks per Contents*, Fifth International World Wide Web Conference, May 6–10, 1996, Paris, France, pp. 1–17.

Salton, G. et al., *Selective Text Utilization and Text Traversal*, Nov. 1993, Hypertext '93 Proceedings, pp. 131–144.

* cited by examiner

FIG.5

TEXT ANALYSIS AND TEXT MATCHING    36'

In conventional information retrieval environments, keywords, or terms, are manually or automatically assigned to the information items, and queries are formulated by using terms interconnected by Boolean operators. Although widely used, the Boolean retrieval model is not ideally suited to the retrieval task: users find it hard to generate effective Boolean queries that will retrieve just the right type and amount of information ; the retrieved items are presented to the users in a random order that does not correspond to any presumed order of relevance or usefulness: and term weights reflecting term importance are awkward to incorporate into Boolean systems in a consistent way. Most importantly, the operations of Boolean logic are unforgiving and inflexible, and the retrieval results are often inadequate. [Salt83,Salt91c]

The vector-processing model represents an alternative possibility for handling information retrieval operations. In that case, both the stored documents as well as the search requests are represented by sets of terms (term vectors) without Boolean operators. Different vectors can be compared with each other and vector similarity coefficients are obtainable reflecting similarity in the term assignments for different vectors. In the vector processing model of retrieval, the same methods are usable for collection structuring (by comparing pairs of document vectors with each other and identifying document pairs found to be sufficiently similar), and for information retrieval (by comparing query vectors with the vectors representing the stored items and retrieving items found to be similar to the queries). The results of a similarity computation between a query vector and the stored document vectors can be ranked in decreasing order of the computed query similarity. This makes it possible to retrieve the most important items (those most similar to the user queries) first. Furthermore, term weights are easily accommodated because vectors of weighted terms are manipulated almost as easily as binary term vectors (where weights are restricted to 1 for assigned terms and 0 for missing terms). [Salt75,Salt71]

A high performance term weighting system assigns large weights to terms that occur frequently in particular documents, but rarely on the outside, because such terms are able to distinguish the items in which they occur from the remainder of the collection. A typical term weight of this type, known as a *tf x idf* weight (term frequency times inverse document frequency). May be defined as In expression (9.26), $\alpha$ and $\beta$ may take values between 0 and 1, and the weights of the $l$ initial may be generated by taking combined term-frequency and inverse-document-frequency weights. The weights of the newly added terms $T_{l+1}$ to $T_{l+m}$ on the other hand, may consist of a combined term-frequency and term-relevance weight of the kind given in the expression (9.16). In the next chapter, procedures are given for applying relevance feedback to the reformulation of Boolean rather than vector queries.

The final indexing prescription, which includes the two basic methods outlined earlier in this section, plus the relevance-feedback system for query reformulations is carried out as follows:

1. Identify individual text words.

2. Use a stop list to delete common words.

3. Use suffix stripping to produce word stems.

4. Replace low-frequency terms with thesaurus classes.

5. Replace high-frequency terms with phrases.

6. Compute term weights for all single terms, phrases, and thesaurus classes.

FIG. 6

METHOD AND APPARATUS FOR DISPLAYING REFERENCES TO A USER'S DOCUMENT BROWSING HISTORY WITHIN THE CONTEXT OF A NEW DOCUMENT

BACKGROUND OF THE INVENTION

1. Field of Invention

This invention relates to electronic document reading systems. More particularly, this invention relates to electronic document reading systems that supplement a document with links to related portions of previously read and annotated documents.

2. Description of Related Art

When a person reads documents for comprehension, the reader establishes relationships between the document currently being read and other, previously read, documents. These relationships are then used by the reader to decide whether the new document should be read in detail (for example, because it complements previously read information) or if it should be skipped because it only duplicates the previously read documents.

Conventional systems and methods of conveying document interrelationships to the reader typically rely on graphical visualizations of documents where each document is represented by a point. One such system is described in "Bead: Explorations in Information Visualization", M. Chalmers et al., Proceedings of SIGIR '92, pp. 330–337, ACM Press (1992), incorporated herein by reference in its entirety. Document relationships can also be represented as a geometric shape. One such system is described in "Visualizing Cyberspace: Information Visualization in the Harmony Internet Browser", K. Andrews, Proceedings of the IEEE Information Visualization Symposium '95, pp. 97–104, IEEE Press (1995), incorporated herein by reference in its entirety. While these techniques efficiently represent very large numbers of documents, they do not effectively represent the content of those documents. By suppressing the document's content when displaying relationships, these systems make it difficult for a reader to understand why and how the documents are related.

Remembrance Agent displays a list of documents that are related to the user's current context while the user enters text. This system is described in "A Continuously Running Automated Information Retrieval System", B. Rhodes et al., Proceedings of the First International Conference on the Practical Application of Intelligent Agents and Multi Agent Technology (PAAM '96), pp. 487–495 (1996), incorporated herein by reference in its entirety. However, Remembrance Agent does not encourage reading or browsing, because the suggestions are ephemeral and thus disappear when additional text is entered. Furthermore, Remembrance Agent does not consider the user's interests. No preference is given to passages that the user found interesting or relevant over other, potentially irrelevant, portions of documents.

Bookmark Organizer presents a hierarchical list of documents, but leaves it to the user to find the appropriate documents. This system is described in "Automatically Organizing Bookmarks Per Contents", Y. Maarek et al., Computer Networks and ISDN Systems, 28 pp. 1321–1333 (1996), incorporated herein by reference in its entirety. In addition, although bookmarks identify the potentially interesting documents, they do not identify the passages that are of specific interest.

There is thus a need for an electronic document reader that supplements new documents with selectable links to relevant and annotated portions of previously read documents.

SUMMARY OF THE INVENTION

This invention provides a system and method that automatically constructs relationships among segments of different documents. Portions of a document that have been identified as being interesting to a user are extracted from previously read documents. These portions may have been explicitly identified to the system by the reader or the relevance of the portion may be inferred by the system based upon cues, such as annotations, made to the documents by the user. The identified portions, or "surrogates", are indexed and linked to the original documents and are used as proxies for the user's various interests. The portions are clustered based upon their relatedness to each other. Therefore, each cluster of portions relates to a topic.

When a new document is opened it is segmented into passages and the passages are compared to the portions from the previously read documents. If a passage of the new document is identified as being closely related to a portion then a selectable link is provided in the new document to the old document from which the identified portion originated. The user may then choose to select the selectable link to the old document to read the portion of the old document to enhance understanding of the new document by reminding or refreshing the understanding of the reader. In this manner a user's understanding of a new document is enhanced.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein:

FIG. 5 shows a display of a previously-read document that is referenced by a selectable link in the display of the new document shown in FIG. 4;

FIG. 6 shows a display of another previously-read document that is referenced by a second selectable link in the display of the new document shown in FIG. 4.

DETAILED DESCRIPTION OF PREFERRED EMBODIMENTS

Figure 1:
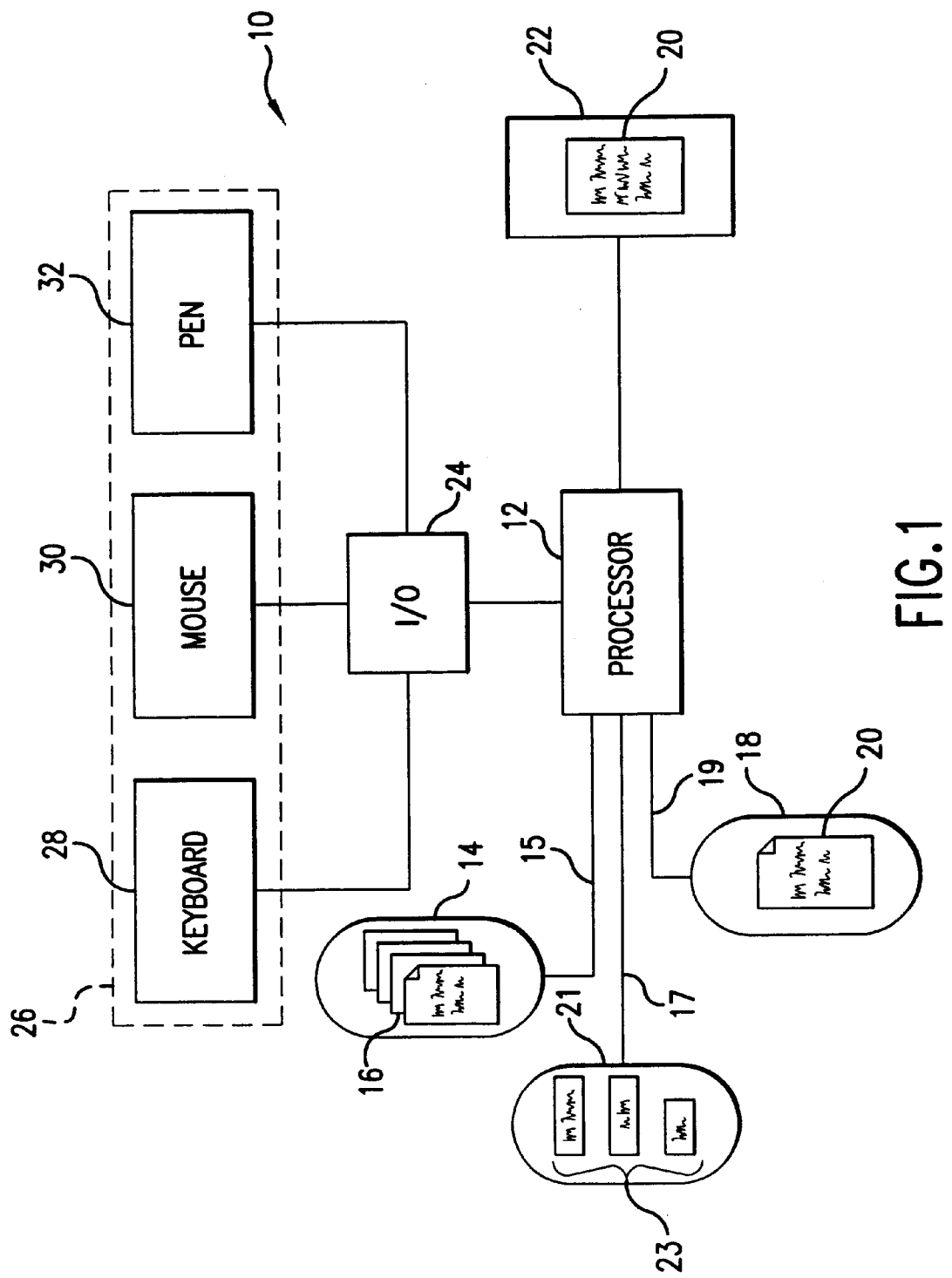
FIG. 1 is a block diagram of one embodiment of the electronic document reader of this invention.

FIG. 1 shows one embodiment of an electronic document reading system 10 of this invention. The electronic document reading system 10 includes a processor 12 communicating with a first memory 14 that stores previously read and annotated documents 16 and a second memory 18 that stores a new document 20 that is currently being read and displayed for a user on a display 22. The processor 12 also communicates with a third memory 21 that stores "surrogates", i.e., portions, 23 of the previously-read documents 16. The processor 12 controls the display 22 to display the new document 20 to the user of the electronic document reading system 10. The processor 12 also communicates with an I/O interface 24 that, in turn, communicates with any number of conventional I/O devices 26, such as a keyboard 28, a mouse 30 and a pen 32. The I/O devices 26 are operated by a user to control the operation of the electronic document reading system 10.

As shown in FIG. 1, the system 10 is preferably implemented using a programmed general purpose computer. However, the system 10 can also be implemented using a special purpose computer, a programmed microprocessor or microcontroller and any necessary peripheral integrated circuit elements, an ASIC or other integrated circuit, a hardwired electronic or logic circuit such as a discrete element circuit, a programmable logic device such as a PLD, PLA, FPGA or PAL, or the like. In general, any device on which a finite state machine capable of implementing the flowcharts shown in FIGS. 2 and 3 can be used to implement the system 10.

Additionally, as shown in FIG. 1, the memories 14, 18 and 21 are preferably implemented using static or dynamic RAM. However, the memories 14, 18 and 21 can also be implemented using a floppy disk and disk drive, a writable optical disk and disk drive, a hard drive, flash memory or the like. Additionally, it should be appreciated that the memories 14, 18 and 21 can be either distinct portions of a single memory or physically distinct memories.

Further, it should be appreciated that the links 15, 17 and 19 connecting the memories 14, 18 and 21 to the processor 12 can be a wired or wireless link to a network (not shown). The network can be a local area network, a wide area network, an intranet, the Internet, or any other distributed processing and storage network. In this case, the electronic document 20, the previously read and annotated documents 16 and the document surrogates 23 are pulled from physically remote memories 14, 18 and 21 through the links 15, 17 and 19 for processing in the system 10 according to the method outlined below. In this case, the electronic document 20, the previously read and annotated documents 16 and the document surrogates 23 can be stored locally in some other memory device of the system 10 (not shown).

The method of this invention relies on at least two subprocesses. The first process maintains a list of document portions 23 and the second process matches the document portions 23 to passages from the new document 20. The results of any matches are displayed to the reader as selectable links in the display of the new document 20 in proximity to the matching passages of the new document 20.

A third optional subprocess clusters the document portions 23 based upon their relatedness to each other. Each cluster then approximates an identification of a topic. The clustering speeds up the processing because the clustering lowers the number of portions to be compared to the new document. The attributes of the clusters are used to compare to the passages of the new document and, once a cluster is identified, the portions within the identified cluster are analyzed. In this manner, the number of portions that are analyzed are greatly reduced because only the portions within an identified cluster are analyzed rather than all portions.

It should be appreciated that, these subprocesses will generally be running concurrently in the background. In particular, as the new document 20 is read and annotated by the user, the subprocess outlined in FIG. 2 generates new portions 23 to be used when reading a subsequent document. At the same time, when the new document 20 is opened, the subprocess outlined in FIG. 3 checks the portions 23 generated from previous documents 16 for relevance to the passages of the new document 20.

Figure 2:
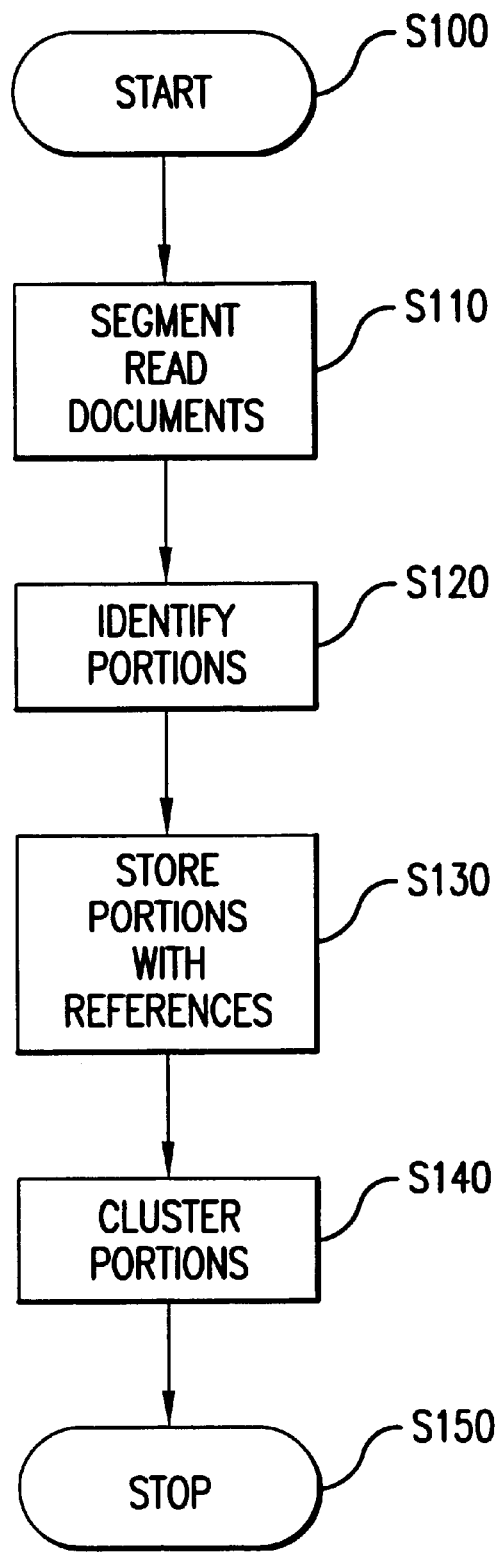
FIG. 2 is a flow chart outlining how the portions are formed and stored.

FIG. 2 is a flowchart outlining how the previously-read documents 16 are analyzed to identify, store and cluster their portions. Preferably, the previously read documents 16 have been annotated by the user so that the surrogates 23 which the user found interesting can be identified and extracted into the memory 21. Starting in step S100, the control routine continues to step S110, where the system segments the documents into portions. The control routine then continues to step S120, where the portions having annotations are identified. Then, in step S130, the control routine stores the identified portions with the references to the underlying annotated pages. Then, in step S140, the portions 21 are clustered using similarity metrics to identify major themes or topics of interest to the user. Similarity metrics are well known, and are described in, for example, "Introduction to Modem Information Retrieval", G. Salton et al., McGraw-Hill, 1983, incorporated herein by reference in its entirety. A set of cluster attributes are also determined for each cluster. Next, the control routine continues to step S150, where the control routine stops.

Preferably, steps S100–S150 are performed continuously in the background as a user reads documents to create an extensive set of clusters of portions of previously read documents.

Figure 3:
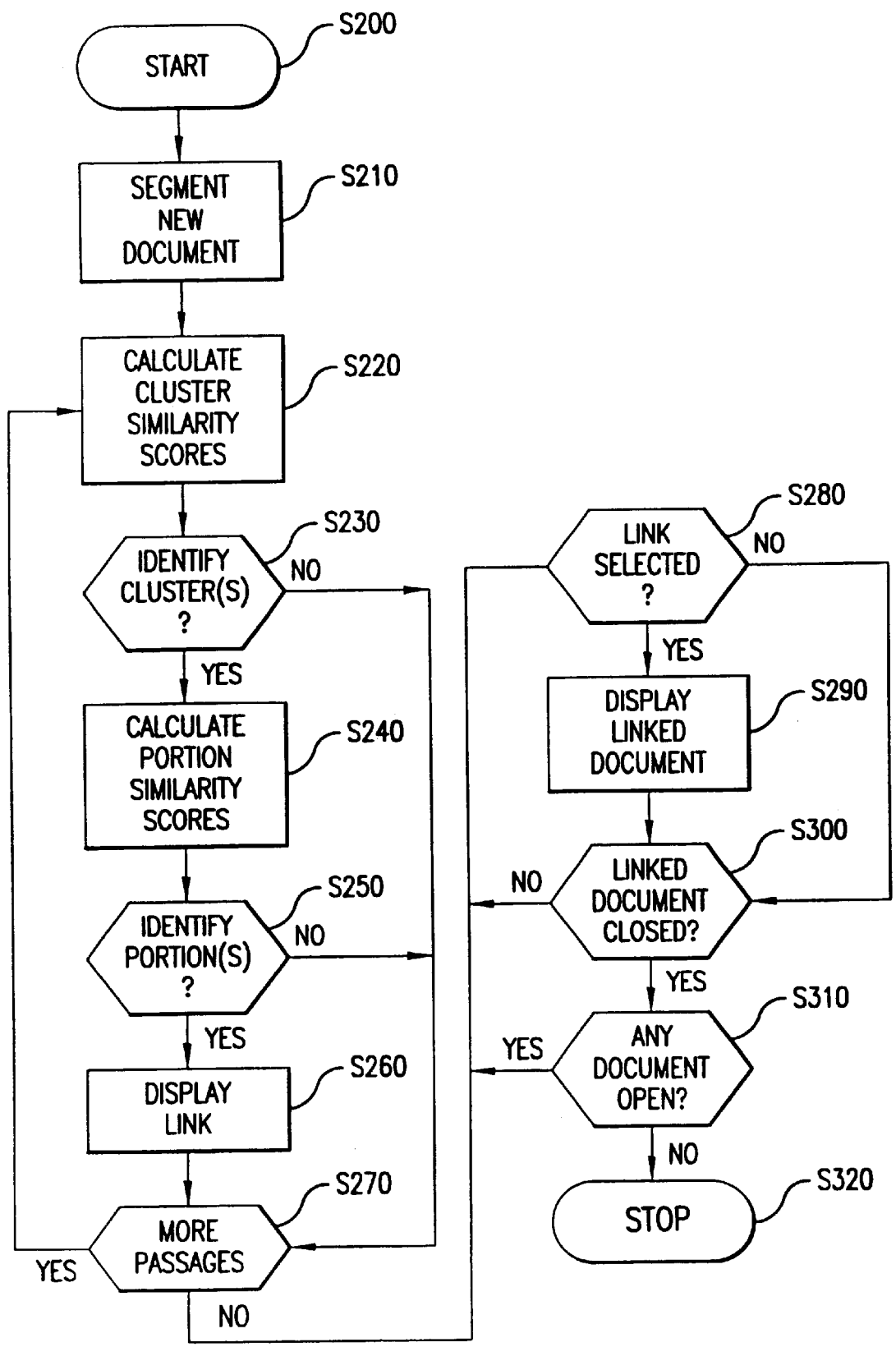
FIG. 3 is a flowchart outlining the control routine of one embodiment of the method of this invention.

FIG. 3 is a flow chart outlining the control routine of one embodiment of the method of this invention. Beginning in step S200, the control routine continues to step S210, where a new document 20 is segmented into passages. Then, in step S220, similarity measures or scores are determined between a selected passage of the new document 20 and each set of cluster attributes in the memory 21. Next, in step S230, the control routine identifies those clusters that have similarity measures that exceed a predetermined or user-specified threshold or, alternatively, the system may identify the cluster with the highest similarity score. If the system identifies cluster(s) having a similarity score exceeding the threshold then control continues to step S240, where the system determines similarity scores for each portion in the identified cluster(s). The control routing then continues to step S250. Step S250 of the system identifies those portions that have a similarity score exceeding a predetermined or user-specified threshold. Control then continues to step S260, where the control routine displays, for each identified portion, one link to the appropriate old document and associates the generated links with the corresponding passage of the new document. Control then continues to step S270. Alternatively, a link to the document from which the portion having the highest similarity score may be generated in the new document. Lastly, if no similarity measures exceed the threshold in steps S230 or S250, then control jumps directly to step S270.

In step S270, the control routine determines if any unchecked passages in the new document 20 exist. If so, control returns to step S220, where the next passage of the new document 20 is selected. Otherwise, control continues to step S280, where the control routine determines if one of the selectable links of a currently displayed document, such as the new document 20, has been selected. If one of the selectable links has been selected, then control continues to step S290. Otherwise, if no selectable link is selected in step S280, the control routine jumps directly to step S300. In step S290, the corresponding old document 16 is displayed on the display 18 in place of the currently displayed document, such as the new document 20 or a previous old document 16. Preferably, the display is centered on the corresponding portion of the old document 16. The control routine then continues to step S300.

In step S300, the control system determines if the user has closed the currently displayed document 20 or 16. If not, control returns to step S280. Otherwise, control continues to step S310.

In step S310, the control routine determines if any document 16 or 20 remains open. If so, control returns to step S280. Otherwise, control continues to step S320, where the control routine stops.

Figure 4:
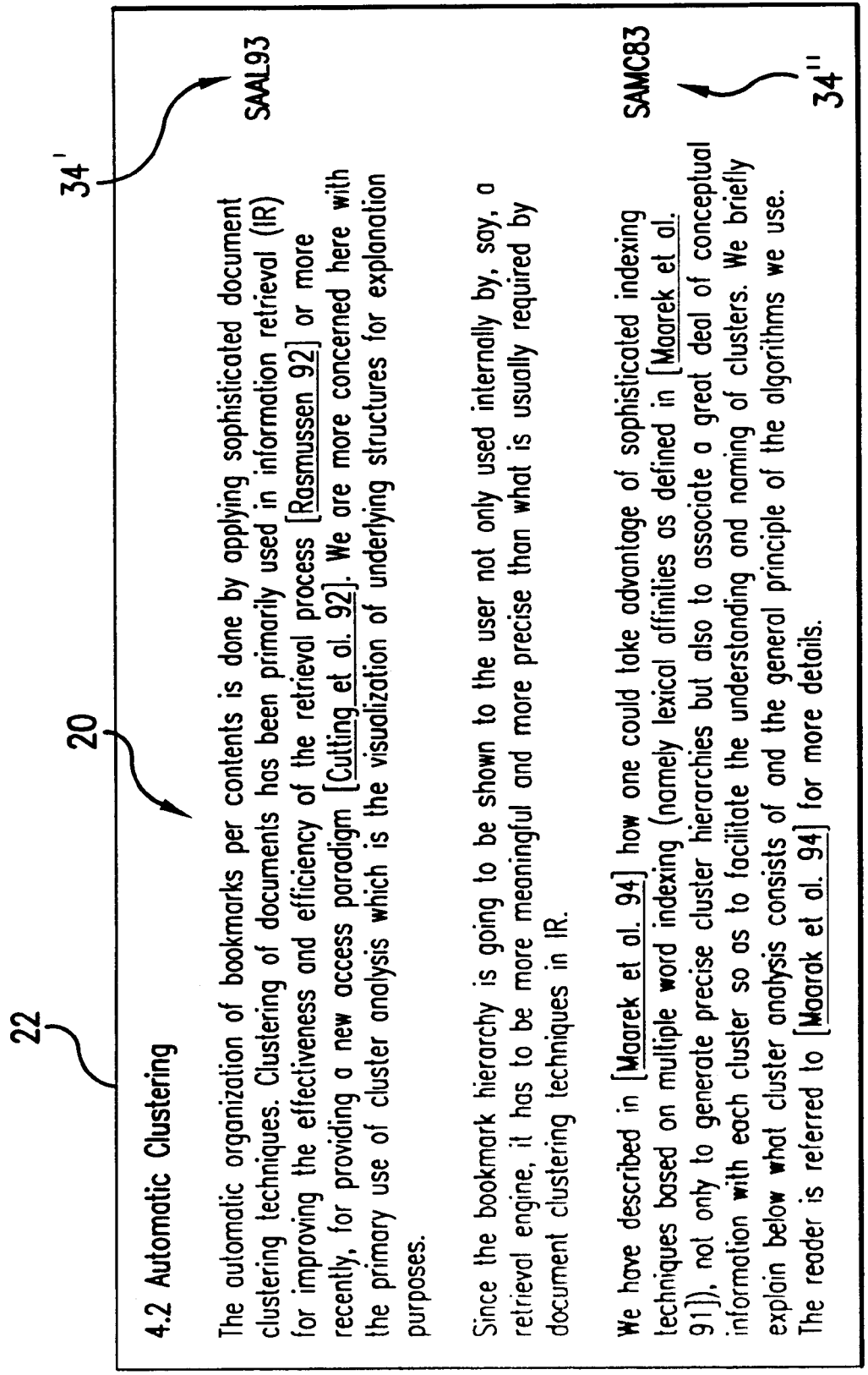
FIG. 4 shows a display of a new document with selectable links to previously-read documents according to this invention.

FIGS. 4–6 show the various documents and links displayed on the display 22 during the operation of one embodiment of the system of this invention according to one embodiment of the method of this invention. In FIG. 4, the display 22 shows to the user a new document 20, along with selectable links 34' and 34". The selectable links 34' and 34" do not interfere or interrupt reading because the links 34' and 34" appear in a margin of the new document 20.

If the user selects one of the selectable links 34' and/or 34", then the display 20 displays the corresponding document 16' or 16". For instance, if the user selects the selectable link 34', which is labeled as "SAAL93", then, as shown in FIG. 5, the display 22 shows the corresponding old document 16' that includes the corresponding identified portion 36'. Alternatively, if the user selects the selectable link 34", which is labeled as "SAMC83", then, as shown in FIG. 6, the display 22 shows the corresponding old document 16" that includes the corresponding identified portion 36".

In one embodiment of this invention, when a selectable link of the currently displayed document 20 or 16 is selected, the corresponding old document 16 is displayed as the new currently displayed document. The corresponding old document 16 is displayed with its selectable links 34 displayed in the margin. Thus, in this case, the old document 16 has become the currently displayed document and the displayed selectable links 34 link the displayed old document 16 to other previously read and annotated documents 16. In this manner, a user of this invention can follow a trail of links to jump from document to document to understand a topic. Accordingly, in this embodiment, if the old document 16 has existing selectable links 34, its selectable links 34 can be displayed. Furthermore, it can be updated with additional selectable links to subsequently read documents.

Figure 7:
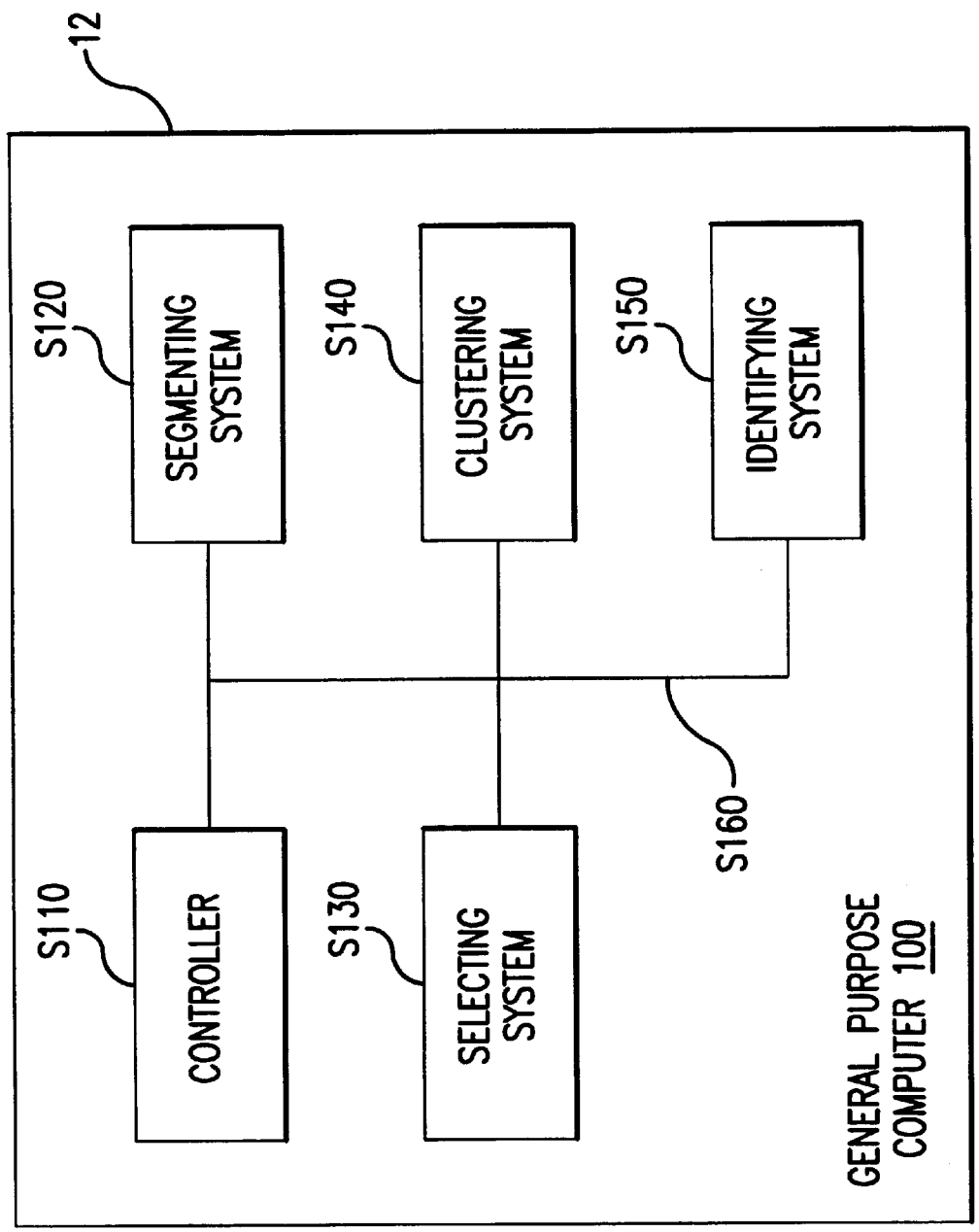
FIG. 7 is a block diagram of one embodiment of the processing system of this invention.

FIG. 7 shows a block diagram of one preferred embodiment of the processor 12 of this invention. As shown in FIG. 7, the processor 12 is preferably implemented using a general purpose computer 100. The general purpose computer 100 preferably includes a controller 110, a segmenting system 120, a selecting system 130, a clustering system 140 and an identifying system 150. These elements of the general purpose computer 100 are interconnected by a bus 160.

The segmenting system 120 and the clustering system 140, controlled by the controller 110, are used to implement the flowchart shown in FIG. 2. The segmenting system 120 and the selecting system 130, controlled by the controller 110, are used to implement the flow chart shown in FIG. 3. It should be appreciated that the segmenting system 120, the selecting system 130, the clustering system 140 and the identifying system 150 are preferably implemented as software routines running on the controller 110 and stored in a memory of the general purpose computer 100. It should be appreciated that many other implementations of these elements will be apparent to those skilled in the art.

It should be understood that the term annotation as used herein is intended to include text, digital ink, audio, video or any other input associated with a document. It should also be understood that the term "document" is intended to include a text document, a video document, an audio document and any other information-storing document and any combination of information-storing documents. The term "document" is also intended to include passages from documents and is not to be limited to whole or entire documents. Further, it should be understood that the term "text" is intended to include text, graphic images, digital ink, audio, video or any other content of a document, including the document's structure. A document's structure is intended to include any divisible portion of a document such as a word, sentence, paragraph, section, chapter, volume, page, etc.

The detailed description describes that the passages of new documents are compared with portions or clusters of portions of previously read documents to determine the similarity between them. This similarity analysis may be done with any number or type of similarity, relatedness or relevance algorithms.

While this invention has been described with the specific embodiments outlined above, many alternatives, modifications and variations are apparent to those skilled in the art. Accordingly, the preferred embodiments described above are illustrative and not limiting. Various changes may be made without departing from the spirit and scope of the invention as defined in the following claims.

What is claimed is:

1. A method for providing a selectable link in a display of a first document to at least one portion of at least one second document, the method comprising:

segmenting the first document into a plurality of passages;

identifying, based on a content similarity analysis of the contents of the plurality of passages and a content of each of the at least one portion, at least one portion that has been annotated in the at least one second document having content similar to the content of at least one of the plurality of passages, said at least one portion of the at least one second document having been previously read and annotated by a user; and displaying in the first document, for each such portion, a visually associated selectable link to the second document containing that identified portion.

2. The method of claim 1, further comprising:

determining if a selectable link is selected; and displaying at least one portion of the second document corresponding to the selected link.

3. The method of claim 1, further comprising:

segmenting each at least one second document into a plurality of portions; and storing the plurality of portions into a memory.

4. The method of claim 3, further comprising:

determining at least one topic from the plurality of portions; and determining which of the plurality of portions are related to each at least one topic, wherein the identified at least one portion is identified based further on the topic related to the identified at least one portion being related to at least one predetermined topic.

5. The method of claim 4, wherein the at least one predetermined topic is selected by the user.

6. The method of claim 3, further comprising determining which of the plurality of portions are annotated.

7. The method of claim 6, wherein determining annotated portions comprises analyzing the content of each of the plurality of portions.

8. The method of claim 3, farther comprising forming the plurality of portions into a plurality of clusters.

9. The method of claim 8, wherein forming the plurality of clusters comprises grouping the plurality of portions using similarity measures.

10. The method of claim 9, wherein the similarity measures include a similarity of the plurality of portions to each other.

11. The method of claim 9, wherein the similarity measures include a similarity of the plurality of portions to at least one predetermined topic.

12. The method of claim 8, wherein identifying the at least one portion as having content similar to at least one of the plurality of passages comprises determining which passages are related to which clusters.

13. The method of claim 12, wherein the step of determining which passages are related to which clusters comprise:

generating a set of cluster attributes for each cluster, that represent the plurality of portions within each corresponding cluster;

identifying a set of cluster attributes as being related to at least one of the plurality of passages; and identifying a portion within the identified cluster as being most closely related to the at least one of the plurality of passages.

14. The method of claim 1, wherein displaying the selectable link comprises displaying each link in a margin of the first document proximate to the determined passage that is similar to an identified portion.

15. The method of claim 1, wherein displaying the selectable link comprises displaying the passage as the selectable link to the corresponding at least one portion.

16. The method of claim 1, wherein displaying the selectable link comprises displaying each link in a predetermined area of the display of the first document.

17. The method of claim 1, wherein the at least one second document is a previously viewed document.

18. An apparatus that provides, in a display of a first document, selectable links to at least one portion of at least one second document, the apparatus comprising:

a processing system, comprising:
  a segmenting system that segments the first document into a plurality of passages;
  an identifying system that, based on a content similarity analysis of the contents of the plurality of passages and a content of each of the at least one portion, identifies at least one of a plurality of portions that has been annotated in the at least one second document that is similar in content to the content of at least one passage of the first document, said at least one portion of the at least one second document having been previously read and annotated by a user; and
  a display that displays the first document and at least one visually associated selectable link, each selectable link linking a passage of the first document to a corresponding one of the at least one second document having at least one portion that is similar in content to that segment.

19. The apparatus of claim 18, wherein the processing system further comprises a selection device for selecting at least one of the at least one selectable link, the display displaying the corresponding at least one portion of the at least one second document based on the selected selectable link.

20. The apparatus of claim 18, wherein the segmenting system segments each at least one second document to generate the plurality of portions.

21. The apparatus of claim 20, further comprising:

a first memory that stores the at least one second document; and a second memory that stores the plurality of portions.

22. The apparatus of claim 20, wherein the identifying system identifies the plurality of portions based on their relatedness to at least one topic.

23. The apparatus of claim 20, wherein the identifying system identifies the plurality of portions based on annotations to the at least one of second document.

24. The apparatus of claim 23, wherein the identifying system identifies the plurality of portions based on the content of the plurality of portions.

25. The apparatus of claim 20, wherein the processing system further comprises a clustering system that clusters the plurality of portions.

26. The apparatus of claim 25, wherein the clustering system clusters the plurality of portions based on a similarity of their contents.

27. The apparatus of claim 26, wherein the clustering system clusters the plurality of portions based on their similarity to each other.

28. The apparatus of claim 26, wherein the clustering system clusters the plurality of portions based on their similarity to at least one topic.

29. The apparatus of claim 25, where the clustering system generates a set of cluster attributes for each cluster that represents the plurality of portions within each corresponding cluster, where the identifying system identifies the at least one of the plurality of portions by identifying at least one cluster having a set of cluster attributes that are similar to at least one passage of the first document and identifying the at least one of the plurality of portions from the portions in the identified cluster.

30. The apparatus of claim 18, wherein the identifying system identifies each similar portion based on a similarity of each passage to a cluster of the at least one portion.

31. The apparatus of claim 18, wherein the display displays the at least one selectable link in a margin of the first document.

32. The apparatus of claim 18, wherein the display displays the at least one selectable link as the display of the passage that corresponds to the at least one portion.

33. The apparatus of claim 18, wherein the display displays the at least one selectable link in a predetermined area of the display of the first document.

34. The apparatus of claim 18, wherein the at least one second document is a previously viewed document.

* * * * *